United States Patent
Bartels et al.

(10) Patent No.: US 11,841,077 B2
(45) Date of Patent: Dec. 12, 2023

(54) MOTOR VEHICLE HAVING A CONTROL ELEMENT FOR SELECTING A VEHICLE OPERATING MODE FROM A PLURALITY OF DEFINED VEHICLE OPERATING MODES

(71) Applicant: Bayerische Motoren Werke Aktiengesellschaft, Munich (DE)

(72) Inventors: Joerg Bartels, Baldham (DE); Johannes Elflein, Munich (DE); Stefan Erschen, Munich (DE); Fabian Herbst, Munich (DE); Michael Marks, Munich (DE); Christian Molitor, Munich (DE); Jens Adrian Roeth, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 192 days.

(21) Appl. No.: 17/596,902

(22) PCT Filed: Jul. 13, 2020

(86) PCT No.: PCT/EP2020/069683
§ 371 (c)(1),
(2) Date: Dec. 21, 2021

(87) PCT Pub. No.: WO2021/023476
PCT Pub. Date: Feb. 11, 2021

(65) Prior Publication Data
US 2022/0316585 A1 Oct. 6, 2022

(30) Foreign Application Priority Data
Aug. 8, 2019 (DE) ...................... 10 2019 121 441.6

(51) Int. Cl.
*F16H 59/02* (2006.01)
*F16H 59/10* (2006.01)
(Continued)

(52) U.S. Cl.
CPC ....... *F16H 59/0204* (2013.01); *F16H 59/105* (2013.01); *F16H 61/0213* (2013.01);
(Continued)

(58) Field of Classification Search
None
See application file for complete search history.

(56) References Cited

U.S. PATENT DOCUMENTS 6,199,003 B1   3/2001   Hollingsworth et al.
2012/0150396 A1   6/2012   Ajimoto et al.
(Continued)

FOREIGN PATENT DOCUMENTS

CN   102537311 A   7/2012
CN   102563035 A   7/2012
(Continued)

OTHER PUBLICATIONS

Chinese-language Office Action issued in Chinese Application No. 202080042646.X dated Aug. 22, 2022 with English translation (16 pages).

(Continued)

*Primary Examiner* — Timothy Hannon
(74) *Attorney, Agent, or Firm* — Crowell & Moring LLP

(57) ABSTRACT

A motor vehicle has a control element for selecting a vehicle operating mode from a plurality of defined vehicle operating modes. Furthermore, the motor vehicle has at least one drive motor and an electronically controllable, automated transmission, which is operable in at least one automatic program and in at least one manual program. The motor vehicle also has an electric control arrangement and at least one button for triggering a changeover from an automatic program to a manual program. The electronic control arrangement is configured such that, upon activation of the button for triggering a manual program for a predefined minimum (Continued)

duration by the driver, an operating mode, which is not selectable via the control element based on dynamics, independent of the activation of the control element, is automatically activatable and displayable on the display instead of a selectable operating mode.

12 Claims, 1 Drawing Sheet

(51) Int. Cl.
*F16H 61/02* (2006.01)
*F16H 59/08* (2006.01)

(52) U.S. Cl.
CPC ........... *F16H 2059/0226* (2013.01); *F16H 2059/0247* (2013.01); *F16H 2059/084* (2013.01); *F16H 2059/085* (2013.01); *F16H 2061/0225* (2013.01)

(56) References Cited

U.S. PATENT DOCUMENTS

| | | |
|---|---|---|
| 2012/0166053 A1 | 6/2012 | Nishida et al. |
| 2013/0297159 A1 | 11/2013 | Nishida et al. |
| 2015/0094921 A1 | 4/2015 | Reichler |
| 2015/0377347 A1* | 12/2015 | Fischer ................. F16H 59/52 701/51 |

FOREIGN PATENT DOCUMENTS

| | | |
|---|---|---|
| CN | 103381817 A | 11/2013 |
| CN | 104246314 A | 12/2014 |
| CN | 104514873 A | 4/2015 |
| DE | 10 2006 025 625 A1 | 12/2007 |
| DE | 10 2013 219 970 A1 | 4/2015 |
| DE | 10 2015 217 648 A1 | 3/2017 |

OTHER PUBLICATIONS

International Search Report (PCT/ISA/210) issued in PCT Application No. PCT/EP2020/069683 dated Sepember 22, 2020 with English translation (five (5) pages).

German-language Written Opinion (PCT/ISA/237) issued in PCT Application No. PCT/EP2020/069683 dated Sep. 22, 2020 (seven (7) pages).

German-language Office Action issued in German Application No. 10 2019 121 441.6 dated Apr. 24, 2020 (two (2) pages).

German-language Search Report issued in German Application No. 10 2019 121 441.6 dated Apr. 24, 2020 with partial English translation (10 pages).

"BMW MI40i Multiple "Kick" Downs" Jun. 5, 2017 (Jun. 5, 2017), XP054980814, https://www.youtube.com/watch?v=IUtc6EAVm8Y [retrieved on Aug. 25, 2020].

\* cited by examiner

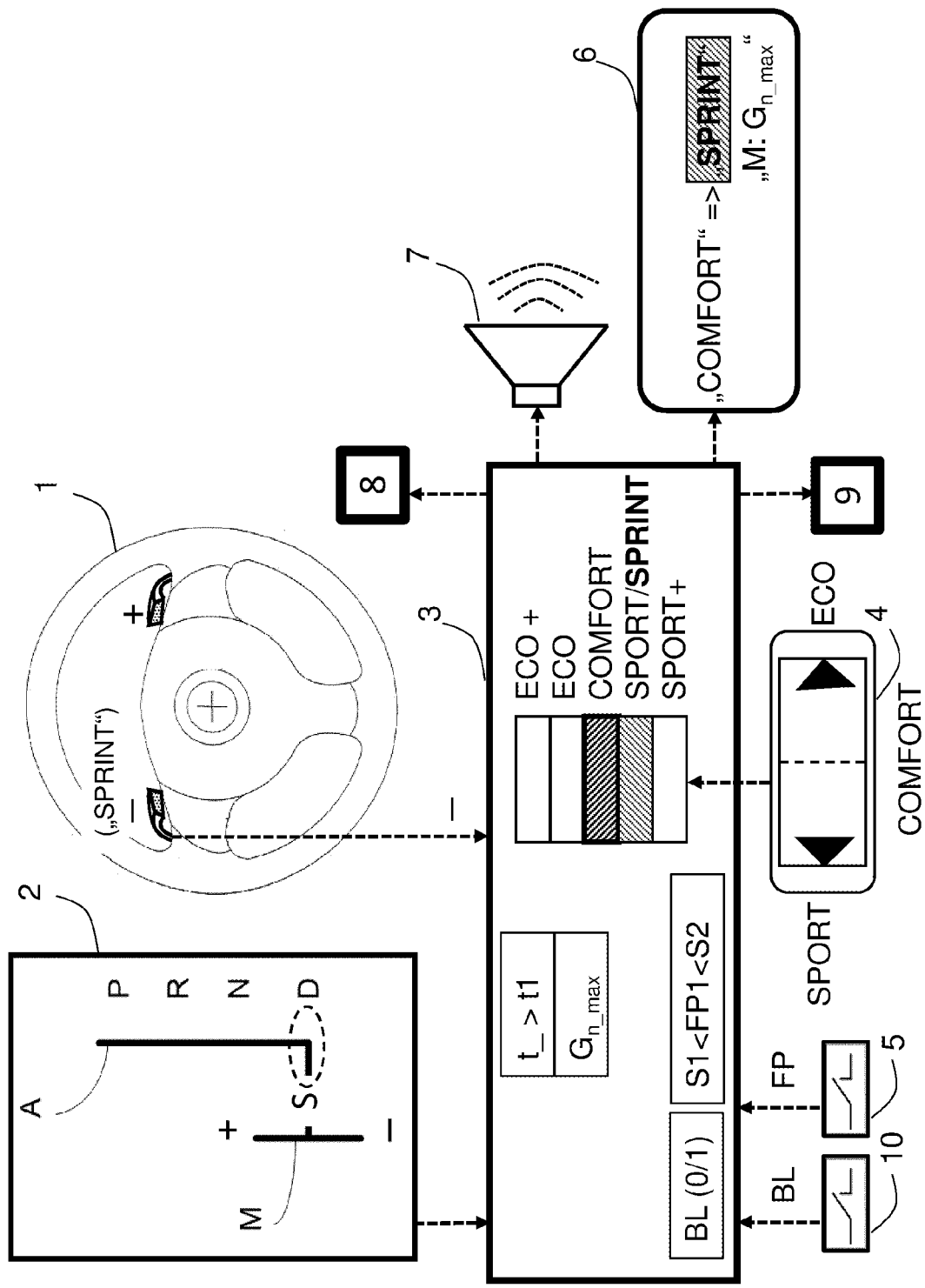

MOTOR VEHICLE HAVING A CONTROL ELEMENT FOR SELECTING A VEHICLE OPERATING MODE FROM A PLURALITY OF DEFINED VEHICLE OPERATING MODES

BACKGROUND AND SUMMARY OF THE INVENTION

The invention relates to a motor vehicle having a control element for selecting a vehicle operating mode from a plurality of defined vehicle operating modes.

For vehicle individualization in particular, such a control element is known, for example, from the so-called driving experience switch in the motor vehicles belonging to the applicant (for example operating instructions for the BMW 5 series from 2018). The driving experience switch can be used to select a "driving mode" from the vehicle operating modes referred to as ECO PRO+, ECO PRO, COMFORT, SPORT and SPORT+ using a toggle switch.

Furthermore, for vehicle individualization, the published patent application DE 10 2006 025 625 A1, for example, discloses a motor vehicle having a first selection device in the form of a selection lever which can be used to define the driving stages P, R, N, D which can be set in an automatic mode. In a manual mode, the gears of the transmission can be manually shifted up or down, in particular in stages, using a second selection device in the form of a steering wheel having two switches ("shift paddles"). The known apparatus has an electronic transmission control device which is conventional in automatic transmissions or automated manual transmissions, referred to here collectively as automated transmissions. In known motor vehicles, an electronic control device, which controls the actuators of the transmission on the basis of the signals from the selection devices and further input signals, is used to first of all carry out a first downshift if at least the second selection device is actuated into the manual downshift position and the selection device is held in this downshift position. Further downshifts are then sequentially carried out if the selection device is held in the downshift position for a relatively long time if a maximum permissible drive motor speed is not exceeded in the respective further downshift.

For this purpose, the selection device, in particular in the form of buttons, is configured in such a manner that it is possible to detect not only tapping on the selection device but also holding of the selection device in a particular position. The detected position is communicated to the control device which is configured in such a manner that it evaluates the detected position and possibly also initiates time-controlled downshifts.

The object of the invention is to further improve a motor vehicle with regard to individual wishes of the driver, in particular in the case of a driving dynamics request which is desired by the driver.

This object is achieved by the claimed invention.

The motor vehicle according to an embodiment of the invention is equipped with a control element for selecting a vehicle operating mode (also called driving mode) from a plurality of defined vehicle operating modes, wherein the respectively selected operating mode is displayed in a display. As stated above, such a control element is fundamentally already known, for example, as a so-called "driving experience switch" in vehicles belonging to the applicant. Furthermore, the motor vehicle according to an embodiment of the invention is equipped with at least one drive motor, with an electronically controllable automated transmission which can be operated in at least one automatic program and in at least one manual program, with at least one button for initiating a changeover from an automatic program to a manual program, and with an electronic control arrangement. The electronic control arrangement, which may be integrated in one electronic device or distributed among a plurality of electronic control devices, is configured in such a manner that, when the button for initiating a manual program is actuated by the driver for a predefined minimum period, irrespective of the actuation of the control element, a dynamics-based operating mode which cannot be selected via the control element can be automatically activated and can be displayed in the display instead of a selectable operating mode. In this case, the manual program need not necessarily be activated. A sporty automatic program could also be or remain activated, for example.

The dynamics-based operating mode which cannot be selected via the control element can preferably be automatically deactivated by way of the control arrangement if a performance requirement or a performance requirement signal is within a defined performance requirement range, preferably for a predefined time. The term performance requirement or performance requirement signal can be understood as meaning, for example, an accelerator pedal angle or an accelerator pedal gradient.

Furthermore, the dynamics-based operating mode which cannot be selected via the control element can remain activated as long as the turn signal of the motor vehicle is set.

The dynamics-based operating mode which cannot be selected via the control element may also correspond to a dynamics-based operating mode which can be selected via the control element.

The dynamics-based operating mode which cannot be selected via the control element preferably comprises the downshift to a gear—preferably the lowest possible gear—which is before a gear which would result in the maximum permissible speed of the drive motor being exceeded.

Finally, in one development of the invention, a defined acoustic dynamics-based noise is output during the dynamics-based operating mode which cannot be selected via the control element until the operating mode is deactivated. A corresponding interior lighting system may also be activated.

For example, the dynamics-based operating mode which cannot be selected via the control element can be referred to as the "SPRINT" mode or "BOOST" mode which may have, for example, the following functionalities over the other operating modes:

The drive coordinator is shifted to "SPORT", that is to say, for example, inter alia, a progressive accelerator pedal characteristic curve and load change stress (steep gradient slope of the engine torque in the case of internal combustion engines as the drive motor), over-run burbling, exhaust gas valve opened (for acoustic feedback and/or for influencing performance);

staging by display; "SPRINT" or "BOOST" writing; a counter may be additionally or alternatively displayed as long as the driver is in the performance requirement range;

staging by sound (active sound design); new design or use of a sport acoustics sound design; or downshifting to the lowest possible gear.

The invention makes it possible to change the vehicle over to maximum sportiness by way of a simple control action during the overtaking maneuver. The impression of acceleration is intensified by way of staging by sound.

Instead of the operating modes mentioned above, it is also possible to select other and/or even more operating modes (so-called iconic experience modes, for example "Original", "Thrill", etc.) than the previously known operating modes (ECO PRO+, ECO PRO, COMFORT, SPORT and SPORT+), which may also comprise control of further actuators (for example the interior light). For this purpose, the control element may likewise be a driving experience switch or a programmable multi-mode button (for example "myMode" button) which can be individually assigned selected operating modes from a selection menu by way of a display control unit.

The invention is explained in more detail by way of an exemplary embodiment.

BRIEF DESCRIPTION OF THE DRAWING

FIG. 1 illustrates an overview of an overall arrangement which is advantageous for embodiments of the invention.

DETAILED DESCRIPTION OF THE DRAWING

FIG. 1 schematically illustrates a motor vehicle having a control element 4 for the driver for selecting a vehicle operating mode from a plurality of defined vehicle operating modes, for example SPORT, COMFORT and ECO. The respectively selected operating mode, for example "COMFORT" here, is displayed in a display 6, for example in the combination instrument or head-up display of the motor vehicle. The control element 4 is known per se and is arranged, for example, in the center console in the passenger compartment. The motor vehicle is also equipped with at least one drive motor 9 and with an electronically controllable automated transmission 8 which—as is likewise already fundamentally known—can be operated in at least one automatic program D ("Drive") or S ("Sport") and in at least one manual program M. In a known manual program M, downshifts or upshifts can fundamentally be sequentially activated, for example, by actuating a button "−" or "+". The buttons "−" or "+" are integrated here, for example, in an S automatic program slot of a transmission selection lever 2 or is in the form of a shift paddle on the steering wheel 1.

The motor vehicle also has an accelerator pedal 5 for emitting a performance requirement signal FP, a turn signal 10 and an electronic control arrangement 3. The electronic control arrangement 3 may be contained in a single control device, for example the transmission control device, or may comprise a plurality of software functional modules in various involved control devices (for example transmission control device, drive motor control device, MIMI control device etc.).

Finally, the motor vehicle according to an embodiment of the invention has a loudspeaker 7 which may be a loudspeaker which is present anyway for entertainment and can be used in an acoustically multifunctional manner.

According to an embodiment of the invention, the electronic control arrangement 3 is configured in the following manner, in particular by way of a corresponding computer program product:

If the button "−", that is to say a button which is fundamentally provided for manual downshifts, is actuated by the driver for a predefined minimum period t1 (also called "long pull on minus paddle"), a dynamics-based special operating mode—called "SPRINT" here—is activated. The button "−" could also have an additional inscription, for example "SPRINT" or "BOOST", for this special operating mode.

The dynamics-based operating mode (SPRINT) which cannot be selected via the control element 4 can be automatically deactivated by way of the control arrangement 3 if a performance requirement signal (in particular an accelerator pedal value FP of between 0% and 100%) is within a predefined performance requirement range (S1<FP1<S2; with S1 equal to 0% to 10%, for example, and with S2 being 80%, for example).

In other words: the dynamics-based operating mode (SPRINT) which cannot be selected via the control element (4) remains activated if the driver actuates the accelerator pedal 5—in particular within a defined time window—in such a manner that a defined performance requirement threshold FP1>S2 is exceeded and/or a defined performance requirement threshold FP1<S1 is undershot or the performance requirement signal is outside a defined performance requirement range, the lower value of which may also be 0%. Otherwise, time-controlled deactivation (for example after 4 seconds) can take place.

This special operating mode "SPRINT" is automatically activated irrespective of the actuation of the control element 4. If, for example, the operating mode "COMFORT" was set for a predefined minimum period t1 before the actuation of the button "−", the special operating mode "SPRINT" is displayed in the display 6 instead of this operating mode "COMFORT".

The special operating mode "SPRINT" results, in a transmission-based manner, in a special manual program or a special automatic program in which a downshift to the lowest possible gear $G_{n\_max}$ is preferably initiated, which gear is before a gear which would result in the maximum permissible speed of the drive motor 9 being exceeded.

Moreover, the special operating mode "SPRINT" can preferably correspond at least partially to a dynamics-based operating mode which can be selected via the control element 4—here "SPORT" for example—but is not displayed in the display 6.

The special operating mode "SPRINT" preferably remains activated as long as a turn signal 10 (BL=1) which has possibly been set for overtaking is reset again (BL=0). The states 0/1 of the turn signal 10 are captured by the control arrangement 3 for this purpose.

Finally, a defined acoustic dynamics-based noise is output via the loudspeaker 7—possibly in a manner dependent on a possible presetting by the driver—during the activation of the special operating mode "SPRINT" until its deactivation.

The passenger compartment of the motor vehicle according to an embodiment of the invention may also have lighting elements—not illustrated here—for a particularly sporty light design which can be activated during the special operating mode "SPRINT".

This invention takes into account, on the one hand, the performance desired by the driver and, on the other hand, the requirements for optimum comfort with regard to simple controllability.

What is claimed is:

1. A motor vehicle comprising:
    a control element for selecting a vehicle operating mode from a plurality of defined vehicle operating modes, wherein the selected operating mode is displayable on a display,
    at least one drive motor,
    an electronically controllable automated transmission which is operable in at least one automatic program and in at least one manual program,
    at least one button for initiating a changeover from an automatic program to a manual program, and an electronic control arrangement which is configured such that, when the button is actuated by a driver for a predefined minimum period, irrespective of the actuation of the control element, a dynamics-based operating mode which cannot be selected via the control element is automatically activatable and displayable in the display instead of a selectable operating mode, wherein the dynamics-based operating mode which cannot be selected via the control element is automatically deactivatable by the control arrangement if a performance requirement signal is within a defined performance requirement range.

2. The motor vehicle according to claim 1, wherein the dynamics-based operating mode which cannot be selected via the control element remains activated as long as a turn signal of the motor vehicle is set.

3. The motor vehicle according to claim 1, wherein the dynamics-based operating mode which cannot be selected via the control element corresponds at least partially to a dynamics-based operating mode which can be selected via the control element.

4. The motor vehicle according to claim 1, wherein the dynamics-based operating mode which cannot be selected via the control element comprises a downshift to a gear which is before a gear which would result in a maximum permissible speed of the drive motor being exceeded.

5. The motor vehicle according to claim 1, wherein a defined acoustic dynamics-based noise is output during the dynamics-based operating mode which cannot be selected via the control element until the operating mode is deactivated.

6. A motor vehicle comprising:
a control element for selecting a vehicle operating mode from a plurality of defined vehicle operating modes, wherein the selected operating mode is displayable on a display,
at least one drive motor,
an electronically controllable automated transmission which is operable in at least one automatic program and in at least one manual program,
at least one button for initiating a changeover from an automatic program to a manual program, and
an electronic control arrangement which is configured such that, when the button is actuated by a driver for a predefined minimum period, irrespective of the actuation of the control element, a dynamics-based operating mode which cannot be selected via the control element is automatically activatable and displayable in the display instead of a selectable operating mode,
wherein the dynamics-based operating mode which cannot be selected via the control element remains activated as long as a turn signal of the motor vehicle is set.

7. The motor vehicle according to claim 6, wherein the dynamics-based operating mode which cannot be selected via the control element corresponds at least partially to a dynamics-based operating mode which can be selected via the control element.

8. The motor vehicle according to claim 6, wherein the dynamics-based operating mode which cannot be selected via the control element comprises a downshift to a gear which is before a gear which would result in a maximum permissible speed of the drive motor being exceeded.

9. The motor vehicle according to claim 6, wherein a defined acoustic dynamics-based noise is output during the dynamics-based operating mode which cannot be selected via the control element until the operating mode is deactivated.

10. A motor vehicle comprising:
a control element for selecting a vehicle operating mode from a plurality of defined vehicle operating modes, wherein the selected operating mode is displayable on a display,
at least one drive motor,
an electronically controllable automated transmission which is operable in at least one automatic program and in at least one manual program,
at least one button for initiating a changeover from an automatic program to a manual program, and
an electronic control arrangement which is configured such that, when the button is actuated by a driver for a predefined minimum period, irrespective of the actuation of the control element, a dynamics-based operating mode which cannot be selected via the control element is automatically activatable and displayable in the display instead of a selectable operating mode,
wherein a defined acoustic dynamics-based noise is output during the dynamics-based operating mode which cannot be selected via the control element until the operating mode is deactivated.

11. The motor vehicle according to claim 10, wherein the dynamics-based operating mode which cannot be selected via the control element corresponds at least partially to a dynamics-based operating mode which can be selected via the control element.

12. The motor vehicle according to claim 10, wherein the dynamics-based operating mode which cannot be selected via the control element comprises a downshift to a gear which is before a gear which would result in a maximum permissible speed of the drive motor being exceeded.

* * * * *